W. S. PALMER.
VEHICLE SUSPENSION.
APPLICATION FILED SEPT. 12, 1910.
988,500.
Patented Apr. 4, 1911.
2 SHEETS—SHEET 1.
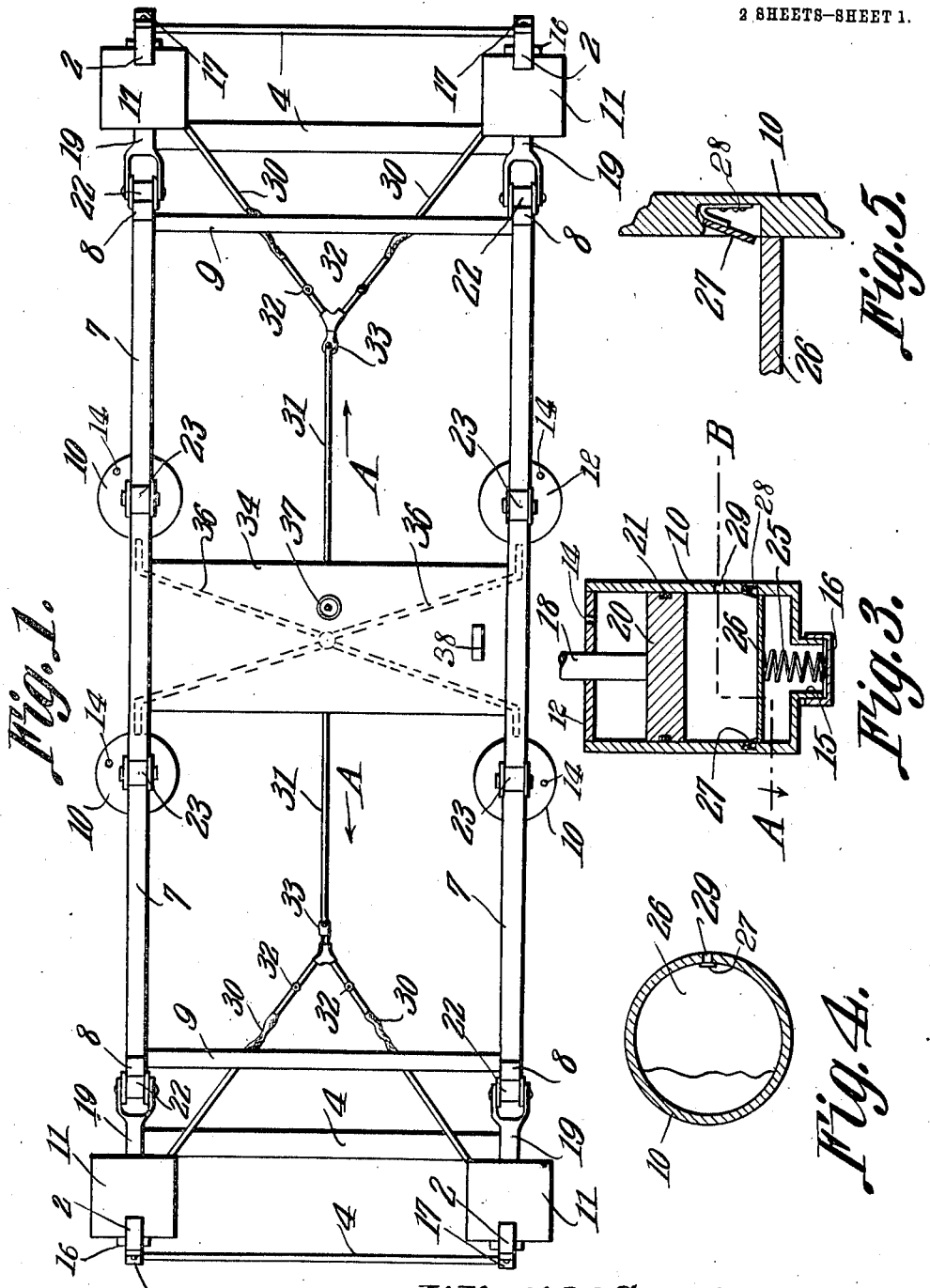
Witnesses
Frank B. Wooden
Mason B. Lawton
Winfield S. Palmer Inventor,
by C. A. Snow & Co.
Attorneys.

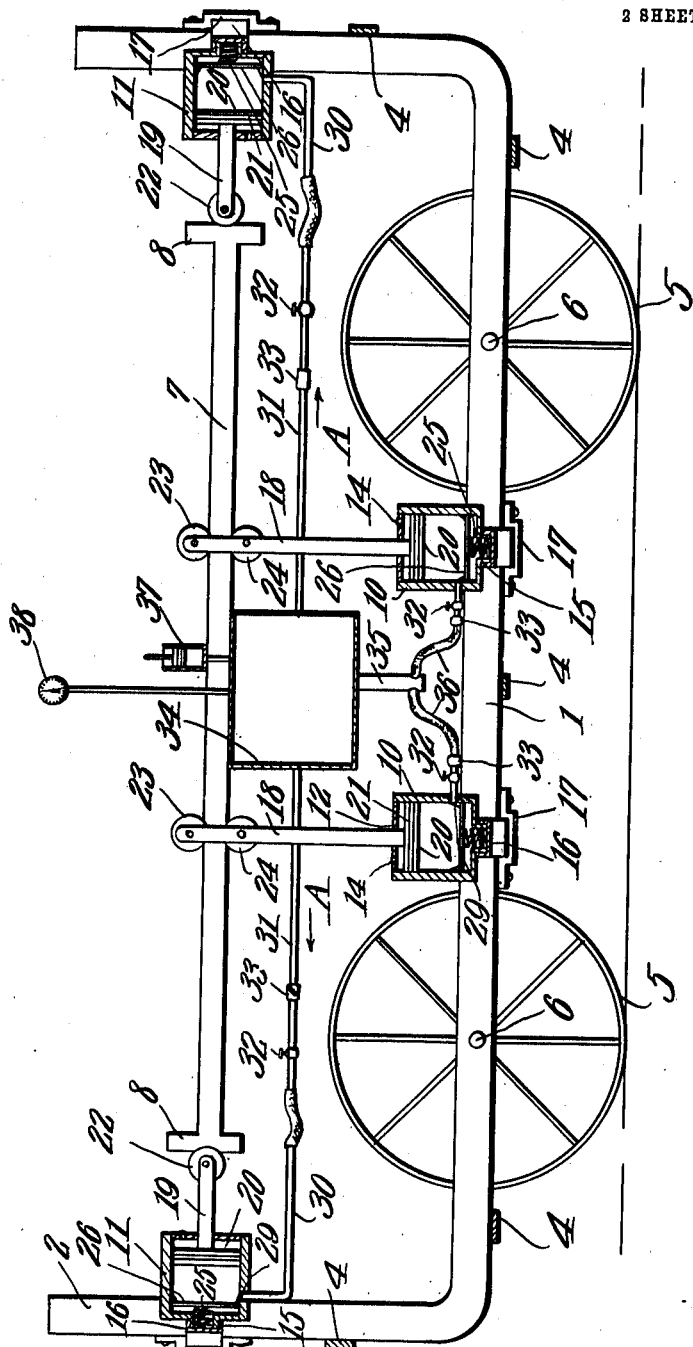

UNITED STATES PATENT OFFICE.

WINFIELD S. PALMER, OF GLENBURN, PENNSYLVANIA.

VEHICLE SUSPENSION.

988,500. Specification of Letters Patent. Patented Apr. 4, 1911.

Application filed September 12, 1910. Serial No. 581,505.

*To all whom it may concern:*

Be it known that I, WINFIELD S. PALMER, a citizen of the United States, residing at Glenburn, in the county of Lackawanna and State of Pennsylvania, have invented a new and useful Vehicle Suspension, of which the following is a specification.

It is the object of this invention to provide a novel means for supporting and sustaining a vehicle-body yieldingly, by means of a member responsive to fluid pressure, the construction of the device being such that fluid pressure upon said member may be maintained and increased at will.

Another object of the invention is to provide novel means for mounting a vehicle body yieldingly both for vertical and for horizontal movement.

Another object of the invention is to provide fluid pressure supporting means for sustaining a vehicle body yieldingly, and to provide independent, resilient means, operable to sustain the vehicle body, upon a failure of the fluid pressure.

Another object of the invention is to provide fluid pressure actuated means for sustaining a vehicle-body, and to provide auxiliary spring means for sustaining the vehicle-body upon the failure of fluid pressure, a device being provided for holding the spring means under compression, said device being releasable, to set the spring means free by contact with a member normally sustained by fluid pressure.

Another object of the invention is to provide novel means for assembling and connecting the several component parts of the structure and to improve generally, devices of the type to which this invention appertains.

The drawings show typical embodiments merely, and it is to be understood that changes properly falling within the scope of the claims may be made without departing from the spirit of the invention.

In the drawings, Figure 1 is a top plan; Fig. 2 is a vertical longitudinal section, the wheels of the vehicle being shown as an added detail; Fig. 3 is a longitudinal section of one of the cylinders; Fig. 4 is a transverse section taken on the line A—B of Fig. 3; and Fig. 5 is a fragmental section of Fig. 3 showing one of the latches in detail.

The vehicle frame may be of any form. In the present instance it is shown as comprising parallel side bars 1 the ends of which are upturned, as denoted by the numeral 2. The side bars 1 and their upturned portions 2 are connected by transverse braces 4. In the side bars 1, the wheels 5 (shown in Fig. 2) are mounted, the axles being denoted by the numeral 6.

The body of the vehicle includes rails 7, disposed above the side bars 1, and cross bars 9, whereby the rails 7 are united, the rails 7 being terminally equipped with transverse vertical heads 8. The body of the vehicle, as above described, may be adapted to receive a vehicle box, not shown, the box and the body being united in any desired manner, depending upon the structure of the particular vehicle to which the invention is applied.

Each of the side bars 1 carries several upright cylinders 10. In the present instance, two of these cylinders 10 are mounted on each of the side bars 1, but obviously, the number of these cylinders 10 may be increased or diminished without jeopardizing the utility of the invention. The upturned portions 2 of the side bars 1 carry horizontally disposed cylinders 11. Four of the cylinders 11 are shown. The cylinders 10 and 11 are provided at their free ends with heads 12, in which heads there are ports 14. The cylinders 10 and 11 are provided at their opposite ends with reduced necks 15, to which caps 16 are threaded, or otherwise secured. These necks 15 together with the caps 16 register, as seen most clearly in Fig. 2 in openings provided for their reception in the side bars 1 and in the upturned portions 2 thereof, these openings being extended entirely through the side bars 1 and through their upturned ends 2. To the outer faces of the ends 2 of the side bars 1 and to the lower faces of the side bars 1 themselves, closure plates 17 are removably applied.

The piston elements which operate in the cylinders 10 include upright rods 18 carrying heads 20, suitably packed, as denoted by the numeral 21. Horizontally disposed rods 19, equipped with the heads 20, operate in the horizontally positioned cylinders 11 which are carried by the ends 2 of the side bars 1. The ends of the horizontal piston rods 19 are forked, to receive for rotation, flanged rollers 22. The vertical heads 8 upon the ends of the rails 7 are engaged between the flanges of the rollers 22, the transverse heads 8 permitting the vehicle-body to have vertical movement between the flanges of the rollers 22. The vertical piston rods 18 are forked at their upper ends, to receive for rotation spaced, flanged rollers 23 and 24, between which the rails 7 are positioned, the rails 7 obviously having a longitudinal movement between the rollers 22 and 23. Compression springs 25 are seated in the necks 15 of the cylinders 10 and 11, the springs 25 abutting terminally against the caps 16. The inner ends of the springs 25 are connected with heads 26, of substantially the same diameter as the bore of the cylinders 10 and 11. The cylinders 10 and 11 at oppositely disposed points are recessed to receive latches 27, these latches being actuated by springs 28, so that the latches at one end outstand to engage the heads 26, the other ends of the latches abutting against the walls of the cylinders 10 and 11. The springs 28 are preferably U-shaped and bear at one end against the cylinders within the contour of the recesses therein, so as to prevent the displacement of the latches 27. In Fig. 3 of the drawings the head 26 is shown retained by the latches 27, the spring 25 being under compression. Beyond the heads 26, when the heads are thus held, are ports 29. These ports 29 in the horizontally disposed cylinders 11 are adapted to receive branch pipes 30 communicating with pipes 31, the pipes 31 communicating with a tank 34 supported in any desired manner upon the body of the vehicle, and preferably connected with the rails 7. In the branch pipes 30 are located cut-off valves 32 of any desired type, whereby the cylinders 11 each may be isolated from the remaining cylinders of the system. In the pipes 31 are located valves 33, adapted to permit air which is within the tank 34, to pass in the direction of the arrows A into the cylinders 11, these valves 33, however, preventing the air from moving contrary to the direction of the arrows A. A pipe 35 depends from the tank 34, and branch pipes 36 connect this pipe 35 with the inlet ports 29 of the cylinders 10. These branch pipes 36 are equipped with cut-off valves 32, and with the one-way valves 33, hereinbefore described. The pipes 30 and 36 are preferably fashioned from flexible material. This construction is necessary, in order that the body of the vehicle may have movement independently of the frame of the vehicle. Fluid pressure is secured and maintained within the tank 34 by means of a pump 37. This pump 37 may be positioned in any desired manner, and may be operated either manually, or by means of a prime mover whereby the vehicle is driven, presupposing that the device is applied to a motor propelled vehicle.

The operation of the device is as follows: When the pump 37 is operated in either of the ways hereinbefore mentioned, air will be compressed within the tank 34, this fluid pressure within the tank 34 being communicated to the piston heads 20 in the cylinders 11, by means of pipes 31 and 30. Fluid pressure is applied to the piston heads 20 in the cylinders 10 by means of the pipes 35 and 36. A gage 38 may be employed to indicate the pressure within the tank 34, and when this gage indicates a diminution of pressure within the tank 34, below the required standard, the pump 37 may be operated to increase the tank pressure. When the several movable members 20 are under sufficient fluid pressure, it will be seen that the cylinders 10 serve to sustain the vertical movement, the cylinders 11 serving to sustain the vehicle body for horizontal movement, the rollers 22, 23 and 24 permitting the vehicle body to move anti-frictionally upon the ends of the piston rods 18 and 19.

Referring particularly to Fig. 3 it will be seen that when the fluid pressure within any cylinder fails, the piston head 20 will move into contact with the latches 27, pressing the latches within the contour of the walls of the cylinder, and releasing the head 26. The compression springs 25 will thus be set free, and will act upon the piston heads 20, replacing the fluid pressure. By means of the cut off valves 32, any one cylinder which becomes inoperative, may readily be cut-out. The piston head 20 is of sufficient thickness so that when it engages the head 26, to set the compression spring 25 free, the piston head 20 can not become engaged beneath, and locked by the latches 27. Presupposing that the piston head 20 and the head 26 are in contact, the piston head 20 being supported by the spring 25, the operation of restoring the spring 25 and the head 26 to the position shown in Fig. 3 is as follows: The closure plate 17, which serves to protect the cap 16, is removed, the cap 16 being subsequently removed from the neck 15 of the cylinder. This operation sets the spring 25 free. The spring 25 and the head 26 may be drawn outwardly until the periphery of the head 26 is engaged by the latches 27, and disposed in the position shown in Fig. 3. The spring 25 may then be compressed within the cylinder whereupon the cap 16 and closure plate 17 may be replaced. The cut-off valve 32 may then be operated, admitting fluid pressure beneath the piston head 20 whereupon the piston head will be operated by fluid pressure, as hereinbefore described.

From the foregoing it will be seen that the vehicle-body is upheld and yieldably retained for lateral movement, by a series of movable members responsive to fluid pressure, the construction being such that when the fluid pressure upon one or more of said members fails, springs will be automatically brought into action to replace the fluid pressure and to support the vehicle body yieldingly upon the vehicle frame.

Having thus described the invention, what is claimed is:

1. Vehicle-body suspension-means including a movable body-engaging member responsive to fluid pressure; a spring normally held under compression and out of engagement with the movable member, the spring being releasable by the movable member, upon the failure of fluid pressure, to bear against the movable member.

2. Vehicle-body suspension-means including a cylinder and a piston operating therein, one of which engages the vehicle-body and the other of which engages the vehicle frame; a compression spring in the cylinder; latches for holding the spring under compression; and means for supplying fluid pressure to the piston; the piston being movable, upon a failure of fluid pressure, to engage the latches and to release the spring, whereby the spring is permitted to bear upon the piston.

In testimony that I claim the foregoing as my own, I have hereto affixed my signature in the presence of two witnesses.

WINFIELD S. PALMER.

Witnesses:
GERTRUDE P. MORRIS,
ALEXANDER P. CLARK.